United States Patent
Lin

(10) Patent No.: US 9,817,483 B1
(45) Date of Patent: Nov. 14, 2017

(54) PROTECTIVE CASE WITH KEYBOARD AND COMBINATION OF PROTECTIVE CASE AND ELECTRONIC DEVICE

(71) Applicant: HTC corporation, Taoyuan (TW)

(72) Inventor: I-Hsuan Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/355,017

(22) Filed: Nov. 17, 2016

(51) Int. Cl.
*G06F 1/16* (2006.01)
*G06F 3/02* (2006.01)

(52) U.S. Cl.
CPC .................................. *G06F 3/0221* (2013.01)

(58) Field of Classification Search
CPC ..................................................... G06F 1/1616
USPC ..................................................... 361/679.01
See application file for complete search history.

(56) References Cited

U.S. PATENT DOCUMENTS

| | | | | |
|---|---|---|---|---|
| 2012/0194448 | A1* | 8/2012 | Rothkopf | A45C 13/002 345/173 |
| 2013/0088431 | A1* | 4/2013 | Ballagas | G06F 1/1626 345/168 |

FOREIGN PATENT DOCUMENTS

| | | |
|---|---|---|
| TW | M511780 | 11/2015 |
| TW | M525043 | 7/2016 |

OTHER PUBLICATIONS

"Office Action of Taiwan Counterpart Application," dated Jun. 29, 2017, pp. 1-16.

* cited by examiner

*Primary Examiner* — Jerry Wu
(74) *Attorney, Agent, or Firm* — JCIPRNET

(57) ABSTRACT

A protective case includes a first side plate, a second side plate connected to the first side plate, a first key module that includes a first set of English keys and is laid out on the first side plate, and a second key module that includes a second set of English keys and is laid out on the second side plate. The first set of English keys and the second set of English keys constitute a complete set of English alphabet keys. When the first side plate is unfolded relative to the second side plate, the first key module and the second key module are unfolded correspondingly to form a keyboard. A combination of the protective case and an electronic device is also provided.

23 Claims, 2 Drawing Sheets

PROTECTIVE CASE WITH KEYBOARD AND COMBINATION OF PROTECTIVE CASE AND ELECTRONIC DEVICE

BACKGROUND

Technical Field

The application relates to a protective case, and particularly relates to a protective case with a keyboard and a combination of the protective case and an electronic device.

Related Art

The tablet computer has partly replaced the notebook computer because of its features of lightness and thinness. A user is able to enter instructions and characters through the touch screen of the tablet computer. Yet when the user needs to use both hands to enter a large number of characters, an extended keyboard would be a good option. Currently there is a kind of extended keyboard for tablet computer with side edges further connected to a protective case. Hence, when folded, the extended keyboard and the protective case respectively cover the two sides of the tablet computer so as to protect the tablet computer. When in use, the protective case is folded up and is magnetically secured into position so as to support the tablet computer behind the extended keyboard, providing a use mode similar to that of a traditional laptop computer. However, in such kind of setting, the horizontal width of the extended keyboard is determined by the maximum width of the tablet computer, thus imposing limitations on the number or size of the input keys of the extended keyboard.

SUMMARY

The application provides a protective case that is for supporting an electronic device (such as a tablet computer) and provides functions of a keyboard.

The application provides a combination of protective case and electronic device, and a protective case thereof is for supporting an electronic device and providing functions of a keyboard.

In the application, a protective case includes a first side plate, a second side plate, a first key module, and a second key module. The second side plate is connected to the first side plate. The first key module includes a first set of English keys and is laid out on the first side plate. The second key module includes a first set of English keys and is laid out on the second side plate. The first set of English keys and the second set of English keys constitute a complete set of English alphabet keys. When the first side plate is unfolded relative to the second side plate, the first key module and the second key module are unfolded correspondingly to form a keyboard.

In the application, a combination of protective case and electronic device includes an electronic device and a protective case. The protective case includes a first side plate, a second side plate, a first key module, and a second key module. The second side plate is connected to the first side plate. The first key module is laid out on the first side plate. The second key module is laid out on the second side plate. When the first side plate is unfolded relative to the second side plate, the first key module and the second key module are unfolded correspondingly to form a keyboard. When the first side plate is flipped such that the first key module on the first side plate faces the second key module on the second side plate, the electronic device is disposed between the first side plate and the second side plate.

Based on the above, in the application, the protective case, when unfolded, supports the electronic device and provides functions of a keyboard and, when folded, covers the two sides of the electronic device to protect the electronic device. It is worth noting that the first key module and the second key module, when unfolded, form a keyboard that has a horizontal width larger than the maximum width of the first side plate or the second side plate. In addition, when folded up, the first foldable plate and the second foldable plate support the electronic device, and coordinate with the first key module and the second key module to provide a use mode similar to that of a laptop computer.

To make the aforementioned and other features and advantages of the application more comprehensible, several embodiments accompanied with drawings are described in detail as follows.

DESCRIPTION OF THE EMBODIMENTS

Figure 1:
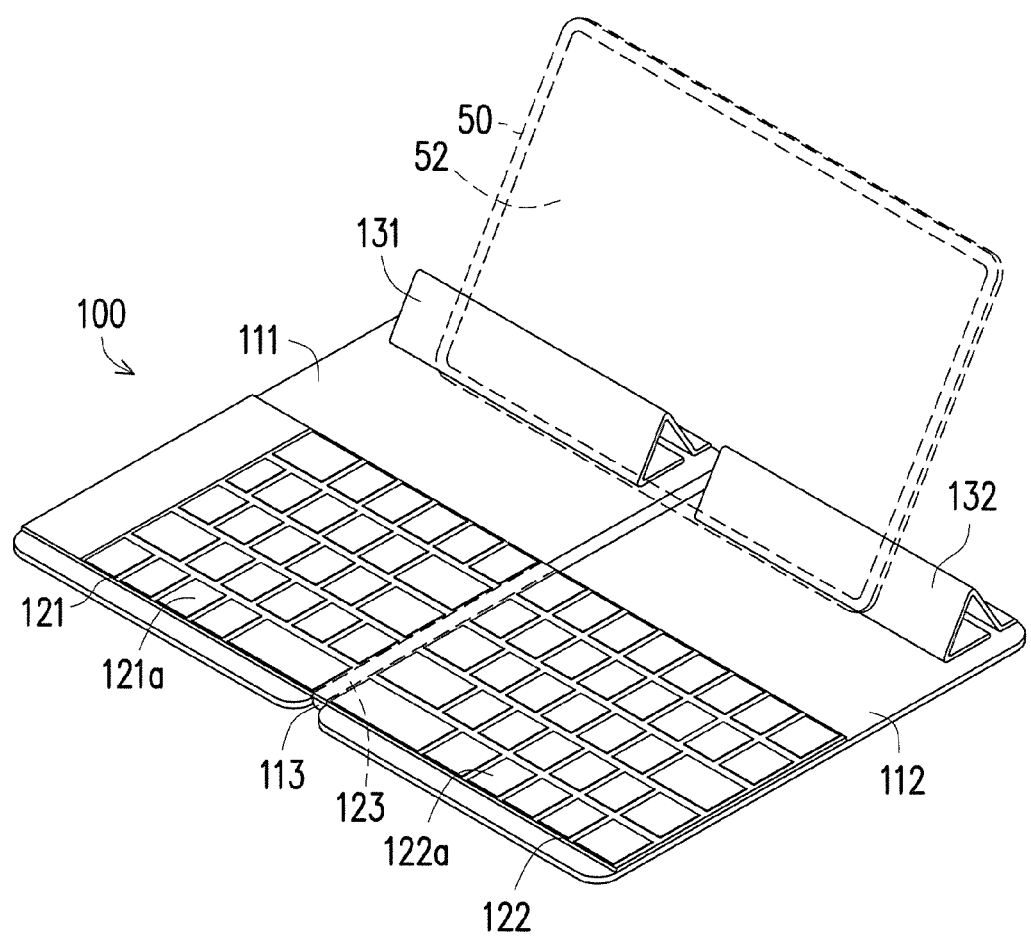
FIG. 1 is a perspective view showing a protective case when the side plates are unfolded and the foldable plates are folded up to support an electronic device according to an embodiment of the application.

Please refer to FIG. 1. In this embodiment, a protective case 100, when unfolded, supports an electronic device 50 (such as a tablet computer) and provides the functions of a keyboard. When the electronic device 50 is not in use, the protective case 100 holds the electronic device 50 and covers two sides of the electronic device 50 to protect the electronic device 50. The protective case 100 and the electronic device 50 form a combination of the protective case 100 and the electronic device 50. The protective case 100 includes a first side plate 111 and a second side plate 112. The second side plate 112 is connected to the first side plate 111, so as to be unfolded or folded relative to each other. In this embodiment, the second side plate 112 is connected to the first side plate 111 via a flexible element 113. In other embodiments, the second side plate 112 may also be connected to the first side plate 111 via a pivoting element.

The protective case 100 further includes a first key module 121 and a second key module 122. The first key module 121 includes a first set of English keys 121a, the second key module 122 includes a second set of English keys 122a, and the first set of English keys 121a and the second set of English keys 122a constitute a complete set of English alphabet keys (such as a Qwerty keyboard). The first key module 121 is laid out on the first side plate 111, and the second key module 122 is laid out on the second side plate 112. When the first side plate 111 is unfolded relative to the second side plate 112, the first key module 121 and the second key module 122 are unfolded correspondingly to form a keyboard that has a horizontal width larger than a maximum width of the first side plate 111 or the second side plate 112. In addition, in this embodiment, the first key module 121 and the second key module 122 are electrically coupled to the electronic device 50 via a wired or wireless connection so as to transmit a signal, input by a user through the first key module 121 and the second key module 122, to the electronic device 50. The wired electrical coupling may be via a physical cable, such as a cable connector, and the wireless electrical coupling may be via a wireless communication module, such as a Bluetooth wireless communication module. In addition, the second key module 122 is connected to the first key module 121 via a pivoting element 123, so that the second key module 122 in a relative position to the first key module 121 becomes more stabilized when unfolded. The pivoting element 123 may be a single-shaft or a double-shaft pivoting mechanism. In other embodiments, the pivoting element 123 is omitted, and the unfolding of the first key module 121 relative to the second key module 122 is achieved through the unfolding of the first side plate 111 relative to the second side plate 112.

Figure 2:
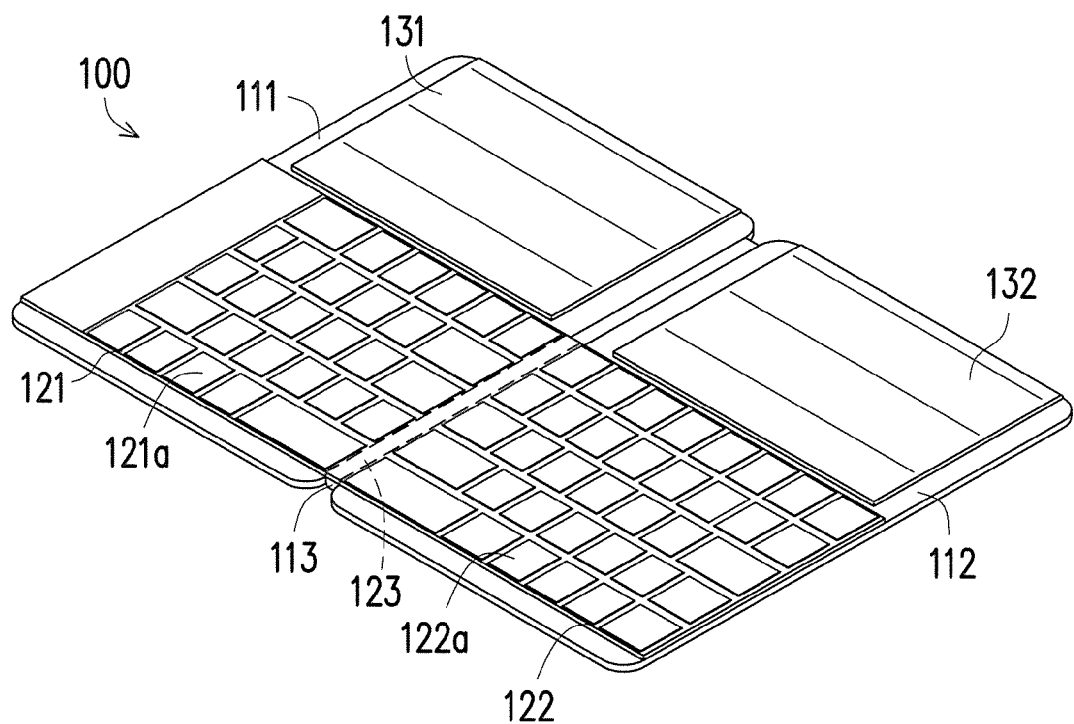
FIG. 2 is a perspective view showing the protective case of FIG. 1 when the foldable plates are spread out flat.

The protective case 100 further includes a first foldable plate 131 and a second foldable plate 132. The first foldable plate 131 is laid out on the first side plate 111, and the second foldable plate 132 is laid out on the second side plate 112. When the first side plate 111 is unfolded relative to the second side plate 112, the first foldable plate 131 and the second foldable plate 132 are folded up and secured into position to support the electronic device 50. Here the first foldable plate 131 includes a plurality of hard pieces (for example, three hard pieces) that are flexibly connected to one another. Accordingly, the first foldable plate 131 may be folded into the shape of a polygonal prism (for example, a triangular prism) on the first side plate 111 to support the electronic device 50, as shown in FIG. 1, or the first foldable plate 131 may be spread out flat on the first side plate 111, as shown in FIG. 2. The second foldable plate 132 has a structure similar to that of the first foldable plate 131. In this embodiment, the first key module 121 and the first foldable plate 131 are respectively laid out on two opposite sides of an inner surface of the first side plate 111, and the second key module 122 and the second foldable plate 132 are respectively laid out on two opposite sides of an inner surface of the second side plate 112.

In this embodiment, the folded-up first foldable plate 131 is magnetically secured into position and is magnetically attracted to the electronic device 50, and the folded-up second foldable plate 132 is magnetically secured into position and is magnetically attracted to the electronic device 50. Specifically, the first foldable plate 131 and the second foldable plate 132 are similar to a conventional protective case for the electronic device 50 in terms of the structure and mode of operation, making use of a plurality of hard pieces flexibly connected to one another and securing the folded-up hard pieces into position by a magnetic force of a plurality of magnetic elements buried within the hard pieces. In addition, the folded-up first foldable plate 131 and the folded-up second foldable plate 132 also employ the magnetic elements buried within to be magnetically attracted to the electronic device 50 so as to make sure that the electronic device 50 is not detached from the folded-up first foldable plate 131 and the folded-up second foldable plate 132. In other embodiments, when the first foldable plate 131 and the second foldable plate 132 are folded up, the first side plate 111 and the second side plate 112 are also magnetically attracted to the electronic device 50. In other words, the first side plate 111 and the second side plate 112 are also magnetically attracted to the electronic device 50 via magnetic elements buried within and coordinate with the weight of the electronic device 50 to secure the folded-up first foldable plate 131 and the folded-up second foldable plate 132 into position, that is, maintaining the shapes of the polygonal prisms that are formed by folding up the first foldable plate 131 and the second foldable plate 132.

Figure 3:
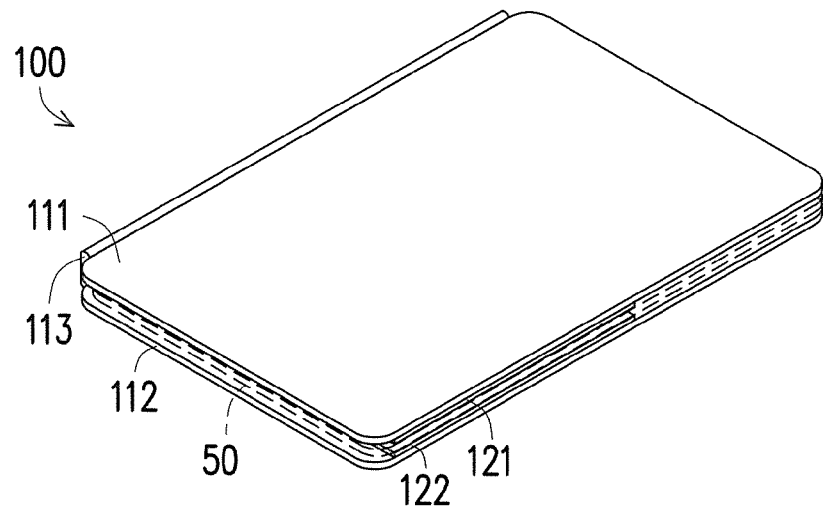
FIG. 3 is a perspective view showing the protective case of FIG. 2 when the side plates are folded to hold the electronic device.

Please refer to FIG. 3. In this embodiment, besides providing structural support and functions of a keyboard, the protective case 100 also holds the electronic device 50 and covers the two sides of the electronic device 50 to protect the electronic device 50. When the first side plate 111 is flipped such that the first key module 121 on the first side plate 111 faces the second key module 122 on the second side plate 112, the electronic device 50 is disposed between the first side plate 111 and the second side plate 112. The electronic device 50 includes a display 52, as shown in FIG. 1, and the second side plate 112 completely covers the display 52 of the electronic device 50. The electronic device 50 receives input data from the first key module 121 or the second key module 122. When the electronic device 50 is disposed between the first side plate 111 and the second side plate 112, the electronic device 50 is secured upon the first side plate 111.

Specifically, when the first side plate 111 and the second side plate 112 are folded, the first side plate 111 and the second side plate 112 hold the electronic device 50 through the first key module 121 and the second key module 122 respectively and through the first foldable plate 131 and the second foldable plate 132 respectively. In order to temporarily secure the electronic device 50 inside the protective case 100, when the first side plate 111 and the second side plate 112 hold the electronic device 50, a combination selected from a group of the first side plate 111, the first side plate 111, the first key module 121, the second key module 122, the first foldable plate 131 and the second foldable plate 132 is magnetically attracted to the electronic device 50. Simply put, the electronic device 50, when held inside the protective case 100, is electronically attracted to any of the components of the protective case 100 via the magnetic elements buried within. In other embodiments, the protective case 100 may secure the electronic device 50 by other methods. For example, the protective case 100 may use elastic bands or elastic claws to secure the corners of the electronic device 50.

In summary of the above, according to the application, the protective case, when unfolded, supports the electronic device and provides functions of a keyboard and, when folded, covers the two sides of the electronic device to protect the electronic device. It is worth noting that the first key module and the second key module, when unfolded, form a keyboard that has a horizontal width larger than the maximum width of the first side plate or the second side plate. In addition, when folded up, the first foldable plate and the second foldable plate support the electronic device, and coordinate with the first key module and the second key module to provide a use mode similar to that of a laptop computer.

Although the embodiments are already disclosed as above, these embodiments should not be construed as limitations on the scope of the application. It will be apparent to those ordinarily skilled in the art that various modifications and variations can be made to the disclosed embodiments without departing from the spirit or scope of this application. In view of the foregoing, it is intended that the application covers modifications and variations provided that they fall within the scope of the following claims and their equivalents.

What is claimed is:

1. A protective case, comprising: a first side plate; a second side plate connected to the first side plate; a first key module that comprises a first set of English keys, the first key module being laid out on the first side plate; a second key module that comprises a second set of English keys, the first key module being laid out on the second side plate, and the first set of English keys and the second set of English keys constituting a complete set of English alphabet keys, wherein when the first side plate is unfolded relative to the second side plate, the first key module and the second key module are unfolded correspondingly to form a keyboard; and a first foldable plate that is laid out on the first side plate; and a second foldable plate that is laid out on the second side plate, wherein when the first side plate is unfolded relative to the second side plate, the first foldable plate and the second foldable plate are foldable to be secured into position to support an electronic device with a display faced to the first and second key modules; when the electronic device is disposed between the first side plate and the second side plate, the electronic device is secured upon the first side plate and the second side plate completely covers the display of the electronic device.

2. The protective case according to claim 1, wherein when the first side plate is flipped such that the first key module on the first side plate faces the second key module on the second side plate, between the first side plate and the second side plate is disposed an electronic device.

3. The protective case according to claim 2, wherein the electronic device comprises a display, and the second side plate completely covers the display of the electronic device.

4. The protective case according to claim 2, wherein when the electronic device is disposed between the first side plate and the second side plate, the electronic device is secured upon the first side plate.

5. The protective case according to claim 2, wherein the electronic device comprises a display, and the electronic device receives input data from the first key module or the second key module.

6. The protective case according to claim 1, wherein the second side plate is connected to the first side plate via a flexible element.

7. The protective case according to claim 1, wherein the second key module is connected to the first key module via a pivoting element.

8. The protective case according to claim 1, wherein the first key module and the first foldable plate are respectively laid out on two opposite sides of an inner surface of the first side plate, and the second key module and the second foldable plate are respectively laid out on two opposite sides of an inner surface of the second side plate.

9. The protective case according to claim 1, wherein the first foldable plate, when folded up, is magnetically secured into position and is magnetically attracted to the electronic device, and the second foldable plate, when folded up, is magnetically secured into position and is magnetically attracted to the electronic device.

10. The protective case according to claim 1, wherein when the first foldable plate and the second foldable plate are folded up, the first side plate and the second side plate are magnetically attracted to the electronic device so as to coordinate with a weight of the electronic device to secure the folded-up first foldable plate and the folded-up second foldable plate into position.

11. The protective case according to claim 1, wherein when the first side plate and the first side plate are folded, the first side plate and the second side plate hold the electronic device through the first key module and the second key module respectively and through the first foldable plate and the second foldable plate respectively.

12. The protective case according to claim 11, wherein when the first side plate and the second side plate hold the electronic device, a combination selected from a group of the first side plate, the first side plate, the first key module, the second key module, the first foldable plate and the second foldable plate is magnetically attracted to the electronic device.

13. A combination of protective case and electronic device, comprising: an electronic device; and a protective case, comprising: a first side plate; a second side plate connected to the first side plate; a first key module that comprises a first set of English keys, the first key module being laid out on the first side plate; a second key module that comprises a second set of English keys, the first key module being laid out on the second side plate, and the first set of English keys and the second set of English keys constituting a complete set of English alphabet keys, wherein when the first side plate is unfolded relative to the second side plate, the first key module and the second key module are unfolded correspondingly to form a keyboard; and a first foldable plate that is laid out on the first side plate; and a second foldable plate that is laid out on the second side plate, wherein when the first side plate is unfolded relative to the second side plate, the first foldable plate and the second foldable plate are foldable to be secured into position to support the electronic device with a display faced to the first and second key modules; when the electronic device is disposed between the first side plate and the second side plate, the electronic device is secured upon the first side plate and the second side plate completely covers the display of the electronic device.

14. The combination of protective case and electronic device according to claim 13, wherein when the first side plate is flipped such that the first key module on the first side plate faces the second key module on the second side plate, the electronic device is disposed between the first side plate and the second side plate.

15. The combination of protective case and electronic device according to claim 13, wherein the electronic device comprises a display, and the electronic device receives input data from the first key module or the second key module.

16. The combination of protective case and electronic device according to claim 13, wherein the second side plate is connected to the first side plate via a flexible element.

17. The combination of protective case and electronic device according to claim 13, wherein the second key module is connected to the first key module via a pivoting element.

18. The combination of protective case and electronic device according to claim 13, wherein the first key module and the first foldable plate are respectively laid out on two opposite sides of an inner surface of the first side plate, and the second key module and the second foldable plate are respectively laid out on two opposite sides of an inner surface of the second side plate.

19. The combination of protective case and electronic device according to claim 13, wherein the first foldable plate, when folded up, is magnetically secured into position and is magnetically attracted to the electronic device, and the second foldable plate, when folded up, is magnetically secured into position and is magnetically attracted to the electronic device.

20. The combination of protective case and electronic device according to claim 13, wherein when the first foldable plate and the second foldable plate are folded up, the first side plate and the second side plate are magnetically attracted to the electronic device so as to coordinate with a weight of the electronic device to secure the folded-up first foldable plate and the folded-up second foldable plate into position.

21. The combination of protective case and electronic device according to claim 13, wherein when the first side plate and the first side plate are folded, the first side plate and the second side plate hold the electronic device through the first key module and the second key module respectively and through the first foldable plate and the second foldable plate respectively.

22. The combination of protective case and electronic device according to claim 21, wherein when the first side plate and the second side plate hold the electronic device, a combination selected from a group of the first side plate, the first side plate, the first key module, the second key module, the first foldable plate and the second foldable plate is magnetically attracted to the electronic device.

23. The combination of protective case and electronic device according to claim 13, wherein the first key module and the second key module are electrically coupled to the electronic device via a wired or wireless connection.

* * * * *